(12) United States Patent
Dotzler et al.

(10) Patent No.: US 11,279,271 B2
(45) Date of Patent: Mar. 22, 2022

(54) VEHICLE SEAT HAVING A SUSPENSION UNIT FOR CUSHIONING ROLLING AND VERTICAL SUSPENSION MOVEMENTS

(71) Applicant: GRAMMER AG, Ursensollen (DE)

(72) Inventors: Florian Dotzler, Hirschau (DE); Konstantin Krivenkov, Amberg (DE)

(73) Assignee: Grammer AG

( * ) Notice: Subject to any disclaimer, the term of this patent is extended or adjusted under 35 U.S.C. 154(b) by 0 days.

(21) Appl. No.: 17/118,877

(22) Filed: Dec. 11, 2020

(65) Prior Publication Data
US 2021/0178943 A1 Jun. 17, 2021

(30) Foreign Application Priority Data
Dec. 13, 2019 (DE) .......................... 102019134233.3

(51) Int. Cl.
*B60N 2/00* (2006.01)
*B60N 2/50* (2006.01)
*B60N 2/52* (2006.01)

(52) U.S. Cl.
CPC ............. *B60N 2/508* (2013.01); *B60N 2/502* (2013.01); *B60N 2/525* (2013.01)

(58) Field of Classification Search
None
See application file for complete search history.

(56) References Cited

U.S. PATENT DOCUMENTS 3,847,338 A 11/1974 Adams
4,095,770 A 6/1978 Long
(Continued)

FOREIGN PATENT DOCUMENTS

DE 2309808 9/1973
DE 4238733 5/1994
(Continued)

OTHER PUBLICATIONS

Official Action for German Patent Application No. 102019134234.1, dated Aug. 11, 2020, 7 pages.
(Continued)

*Primary Examiner* — Steven M Marsh
(74) *Attorney, Agent, or Firm* — Sheridan Ross P.C.

(57) ABSTRACT

The invention relates to a vehicle seat having a suspension unit for cushioning the rolling and vertical suspension movements of the vehicle seat, wherein the vehicle seat has a vehicle seat upper part and a vehicle seat lower part, wherein the vehicle seat upper part and the vehicle seat upper part are connected by means of the suspension unit so that the vehicle seat upper part and the vehicle seat lower part are movable relative to one another, wherein the suspension unit comprises a scissor arrangement having a first scissor arm and a second scissor arm, characterised in that the suspension unit is rotatably connected about a first axis of rotation to the vehicle seat lower part and comprises a spring element support and a first spring element, the first spring element being connected on the one hand to the vehicle seat lower part and on the other hand to the spring element support which is rotatably connected about a second axis of rotation to the first scissor arm and rotatably connected about a third axis of rotation to the second scissor arm, and the first spring element being preferably arranged at a first angle to a vehicle seat width direction and at a second angle to a vehicle seat height direction.

14 Claims, 8 Drawing Sheets

(56) References Cited

U.S. PATENT DOCUMENTS

| | | | |
|---|---|---|---|
| 4,645,169 A | 2/1987 | Mischer | |
| 4,856,763 A | 8/1989 | Brodersen et al. | |
| 5,169,112 A * | 12/1992 | Boyles | B60N 2/501 248/550 |
| 5,251,864 A | 10/1993 | Itou | |
| 5,735,509 A * | 4/1998 | Gryp | B60N 2/501 248/550 |
| 5,927,679 A | 7/1999 | Hill | |
| 5,957,426 A | 9/1999 | Brodersen | |
| 5,975,508 A | 11/1999 | Beard | |
| 6,135,225 A | 10/2000 | Barsic | |
| 6,366,190 B1 | 4/2002 | Fujita et al. | |
| 6,550,740 B1 | 4/2003 | Burer | |
| 6,616,117 B2 | 9/2003 | Gryp et al. | |
| 7,000,910 B2 | 2/2006 | Oshimo | |
| 7,568,675 B2 | 8/2009 | Catton | |
| 7,988,232 B2 | 8/2011 | Weber et al. | |
| 8,585,004 B1 * | 11/2013 | Roeglin | F16M 11/18 248/421 |
| 8,800,976 B2 | 8/2014 | Bethina et al. | |
| 9,527,416 B2 | 12/2016 | Brodersen | |
| 9,644,378 B2 | 5/2017 | Knox | |
| 9,694,727 B2 | 7/2017 | Haller et al. | |
| 9,758,078 B2 | 9/2017 | Haller | |
| 9,809,136 B2 | 11/2017 | Haller et al. | |
| 9,937,832 B2 * | 4/2018 | Haller | B60N 2/527 |
| 10,012,286 B2 | 7/2018 | Haller et al. | |
| 10,583,753 B2 | 3/2020 | Lorey et al. | |
| 10,654,381 B2 | 5/2020 | Lorey et al. | |
| 2004/0090100 A1 | 5/2004 | Igarashi | |
| 2007/0096513 A1 | 5/2007 | Jones et al. | |
| 2007/0295882 A1 | 12/2007 | Catton | |
| 2009/0134595 A1 | 5/2009 | Haller et al. | |
| 2010/0224343 A1 | 9/2010 | Fukuma et al. | |
| 2011/0226930 A1 | 9/2011 | Enns et al. | |
| 2011/0284713 A1 | 11/2011 | Ellerich | |
| 2012/0097822 A1 | 4/2012 | Hammarskiold | |
| 2013/0140865 A1 | 6/2013 | Shin | |
| 2013/0206949 A1 | 8/2013 | Archambault | |
| 2013/0306825 A1 * | 11/2013 | Brodersen | B60N 2/507 248/419 |
| 2014/0091191 A1 | 4/2014 | Romera Carrion | |
| 2014/0131542 A1 * | 5/2014 | Hodnefield | B60N 2/508 248/419 |
| 2014/0316661 A1 | 10/2014 | Parker et al. | |
| 2015/0232004 A1 * | 8/2015 | Haller | B60N 2/164 248/562 |
| 2015/0232005 A1 | 8/2015 | Haller et al. | |
| 2016/0200230 A1 | 7/2016 | Haller | |
| 2016/0207430 A1 | 7/2016 | Haller | |
| 2016/0214658 A1 | 7/2016 | Haller | |
| 2019/0009697 A1 * | 1/2019 | Lorey | B60N 2/522 |
| 2020/0108751 A1 | 4/2020 | Dotzler et al. | |
| 2020/0122612 A1 | 4/2020 | Fillep et al. | |

FOREIGN PATENT DOCUMENTS

| | | |
|---|---|---|
| DE | 20101762 | 5/2001 |
| DE | 102009022328 | 6/2010 |
| DE | 102015121764 | 8/2017 |
| DE | 102016120194 | 4/2018 |
| DE | 102016222800 | 5/2018 |
| DE | 102018112004 | 11/2019 |
| DE | 102018124507 | 4/2020 |
| DE | 102018124512 | 4/2020 |
| EP | 1863671 | 1/2012 |
| EP | 2463146 | 6/2012 |
| EP | 3181396 | 6/2017 |
| EP | 3428009 | 1/2019 |
| FR | 912187 | 8/1946 |
| GB | 2009881 | 6/1979 |
| JP | H01-136031 | 9/1989 |
| JP | H03-220031 | 9/1991 |
| WO | WO 2007/058572 | 5/2007 |
| WO | WO 2009/054788 | 4/2009 |
| WO | WO 2014/176130 | 10/2014 |

OTHER PUBLICATIONS

Official Action for German Patent Application No. 102019134233.3, dated Jun. 15, 2020, 6 pages.
Official Action for German Patent Application No. 102019134237.6, dated Aug. 11, 2020, 8 pages.
Extended Search Report with machine translation for European Patent Application No. 20000444.8, dated Apr. 16, 2021, 11 pages.
Extended Search Report with machine translation for European Patent Application No. 20000443.0, dated Apr. 16, 2021, 12 pages.
Extended Search Report with machine translation for European Patent Application No. 20000445.5, dated Apr. 16, 2021, 11 pages.

* cited by examiner

VEHICLE SEAT HAVING A SUSPENSION UNIT FOR CUSHIONING ROLLING AND VERTICAL SUSPENSION MOVEMENTS

CROSS-REFERENCE TO RELATED APPLICATION

This application claims the benefit of German Patent Application No. 102019134233.3 filed Dec. 13, 2019, the entire contents of which are incorporated herein by reference.

FIELD

The invention relates to a vehicle seat having a suspension unit for cushioning the rolling and vertical suspension movements of the vehicle, wherein the vehicle seat has a vehicle seat upper part and a vehicle seat lower part, wherein the vehicle seat upper part and the vehicle seat lower part are connected by means of the suspension unit so that the vehicle seat upper part and the vehicle seat lower part are movable relative to one another, wherein the suspension unit comprises a scissor arrangement having a first scissor arm and a second scissor arm.

BACKGROUND

Vehicle seats having roll and vertical suspensions are known from the prior art; for example, WO 2014/176130 A discloses a roll suspension which can cushion rolling movements of the vehicle or the vehicle seat. However, such a rolling movement, as shown in the prior art, is very complex to implement in terms of design, requires many actively controlled components, and takes up a large amount of space.

SUMMARY

The object of the present invention is therefore to provide a vehicle seat having a suspension unit for cushioning rolling and vertical suspension movements, which is constructed in a simpler manner than that shown in the prior art.

The core idea of the present invention is to provide a vehicle seat having a suspension unit for cushioning rolling and vertical suspension movements of the vehicle, wherein the vehicle seat has a vehicle seat upper part and a vehicle seat lower part, wherein the vehicle seat upper part and the vehicle seat lower part are connected by means of the suspension unit so that the vehicle seat upper part and the vehicle seat lower part are movable relative to one another, wherein the suspension unit comprises a scissor arrangement having a first scissor arm and a second scissor arm, the suspension unit being connected rotatably about a first axis of rotation to the vehicle seat lower part and comprising a spring element support and a first spring element, the first spring element being connected on the one hand to the vehicle seat lower part and on the other hand to the spring element support which preferably is rotatably connected about a second axis of rotation to the first scissor arm and rotatably connected about a third axis of rotation to the second scissor arm, and the first spring element being preferably arranged at a first angle to a vehicle seat width direction and at a second angle to a vehicle seat height direction.

Alternatively, the underlying object is achieved by a vehicle seat having a suspension unit for cushioning rolling and vertical suspension movements of the vehicle, wherein the vehicle seat has a vehicle seat upper part and a vehicle seat lower part, wherein the vehicle seat upper part and the vehicle seat lower part are connected by means of the suspension unit so that the vehicle seat upper part and the vehicle seat lower part are movable relative to one another, wherein the suspension unit comprises a scissor arrangement having a first scissor arm and a second scissor arm, the suspension unit being connected rotatably about a first axis of rotation to the vehicle seat lower part and comprising a first spring element, the first spring element being connected on the one hand to the vehicle seat lower part and on the other hand to the vehicle seat upper part, and the first spring element being preferably arranged at a first angle to a vehicle seat width direction and at a second angle to a vehicle seat height direction.

A "rolling movement" is understood in this case to mean a rotational movement of the vehicle seat about an axis of rotation which is arranged to run in the longitudinal direction of the vehicle seat.

The first axis of rotation is therefore particularly preferably arranged parallel to the vehicle seat longitudinal direction.

According to a preferred embodiment, it is also provided that the vehicle seat upper part and the vehicle seat lower part can be cushioned or moved or displaced relative to one another by means of the suspension unit.

According to a particularly preferred embodiment, the first spring element is preferably one selected from an air spring and a mechanical spring.

In particular, the first spring element is arranged to run in the direction of the first angle and of the second angle, i.e. the first spring element is arranged to run obliquely as seen in a standard coordinate system.

The standard coordinate system is formed from the vehicle seat longitudinal direction, the vehicle seat width direction and the vehicle seat height direction, which are each arranged at a right angle to one another.

Because, according to the invention, the first spring element is connected to the spring element support and the vehicle seat lower part, it can be concluded that the first angle and the second angle are a function of the spring position of the vehicle seat. By a suspension movement, which can be a rolling and/or vertical suspension movement, the position of the spring element support changes in space, so that a first end of the first spring element also changes its position in space, wherein a second end of the first spring element, which is connected to the vehicle seat lower part, is not changed in its position. This means in particular that the first angle and the second angle are not constant during a suspension movement of the vehicle seat. In a neutral position, which means that the vehicle seat is not subject to any suspension movement, i.e. there is no relative movement of the vehicle seat upper part with respect to the vehicle seat lower part, the first angle and the second angle are constant.

Depending on the size of the first angle and the second angle, it is possible to adjust the spring stiffness of the first spring element. The spring stiffness is in particular an adjustment option for the vertical direction and for the rolling direction for the suspension movement. By adjusting the first angle and the second angle, it is possible to adjust the spring stiffness with regard to the vertical direction and the rolling direction or the rolling spring direction and vertical spring direction.

It is particularly preferred that the first scissor arm and the second scissor arm intersect in a first region, viewed in the vehicle seat longitudinal direction, wherein provision is made that no structural connection is provided between the first scissor arm and the second scissor arm, with the exception of the spring element support. This means in particular that when the vehicle seat upper part moves with respect to the vehicle seat lower part, the first region, which represents the intersection region of the first scissor arm with the second scissor arm, must follow the movement of the vehicle seat. In particular, this means that there is no common axis of rotation between the first scissor arm and the second scissor arm.

According to an alternative configuration, a structural connection is provided between the first scissor arm and the second scissor arm, so that the scissor arrangement is a scissor frame in the conventional sense, i.e. the scissor arms are rotatably connected to one another about a common axis of rotation. In this case, the spring element support is preferably fastened directly to the common axis of rotation.

It can be provided that the first scissor arm and the second scissor arm are force-connected, for example by a frictional force, if the scissor arms are in contact with one another.

The above-described forced guidance or forced movement of the spring element support due to the movement of the vehicle seat upper part relative to the vehicle seat lower part produces a spring force of the first spring element, so that cushioning of the vehicle seat is caused by the suspension unit.

Generally speaking, when the vehicle seat upper part moves relative to the vehicle seat lower part in a vertical direction, i.e. in the vehicle seat height direction, due to an external force acting on the vehicle seat, the rotatable arrangement of the spring element support on the first scissor arm or the second scissor arm causes a corresponding movement of the spring element support. This means that in the event of a vertical deflection, i.e. a deflection in the vehicle seat height direction, the spring element support experiences a linear displacement corresponding to the vehicle seat upper part in the vehicle seat height direction. In the event of a rolling movement of the vehicle seat, i.e. in the event of a rotation of the vehicle seat upper part relative to the vehicle seat lower part about the first axis of rotation, the spring element support is also subjected to such a rolling movement. The first spring element is deformed by the rolling movement of the spring element support, so that a spring force is produced which counteracts the rolling movement.

According to a particularly preferred embodiment, it is provided that the suspension unit comprises a second spring element, wherein the second spring element is connected on the one hand to the displacement element and on the other hand to the spring element support, and wherein the second spring element is arranged at a third angle to the vehicle seat width direction and arranged at a fourth angle to the vehicle seat height direction.

As an alternative, the second spring element can particularly preferably be connected to a further displacement element which is independent of the displacement element. This means that the displacement element and the further displacement element are independent of one another.

The second spring element is particularly preferably arranged in such a way that, with respect to a plane formed from the vehicle seat longitudinal direction and the vehicle seat height direction, the first spring element is arranged on a first side of the plane and the second spring element on the second side of the plane.

It is also possible that the first angle corresponds to the third angle and the second angle corresponds to the fourth angle, so that the first spring element and the second spring element are arranged symmetrically to one another with respect to the plane formed from the vehicle seat longitudinal direction and the vehicle seat height direction.

However, it is also possible that the first angle has a different value from the third angle and that the second angle has a different value from the fourth angle.

It is pointed out that "symmetrical" is to be understood to mean in the neutral state, i.e. no external force is acting on the vehicle seat. With a suspension movement of the vehicle seat, the arrangement of the spring elements in relation to one another changes since, in particular during a rolling movement, one spring element is compressed and the other spring element is correspondingly decompressed, i.e. one spring element is compressed and the other spring element is stretch in its length.

According to a particularly preferred embodiment, it is provided that the first angle and the second angle can each assume a value from a range of 0 to 90°].

According to a further preferred embodiment, it is provided that the third angle and the fourth angle can each assume a value from a range of 0 to 90°].

It is particularly preferably provided that the first angle, the second angle, the third angle and the fourth angle cannot assume the angle value 90°, i.e. the angles can each assume a value in the range of 0 to 90°. This means that, when seen in particular in the vehicle seat height direction, the spring elements do not correspond to a vertical spring.

According to a further preferred embodiment, it is provided that the first axis of rotation is arranged parallel to the vehicle seat longitudinal direction, and preferably the second axis of rotation and the third axis of rotation are arranged running in the vehicle seat width direction and the second and the third axis of rotation are arranged parallel to one another.

In particular, the arrangement of the second axis of rotation and the third axis of rotation can prevent the scissor arrangement with the spring element support from tilting, in particular when the vehicle seat upper part moves relative to the vehicle seat lower part.

According to a particularly preferred embodiment, it is provided that the first axis of rotation is defined by a shaft which is rotatably connected to the vehicle seat lower part. The shaft preferably has a first end and a second end, wherein the first end and the second end each are rigidly connected to the vehicle seat lower part. Instead of a shaft, a rod element is also conceivable, wherein it is possible for the shaft or the rod element to be cylindrical or angular. If the rod element is angular, it is rotatably connected to the vehicle seat lower part.

According to a further preferred embodiment, it is provided that the first scissor arm is connected to the vehicle seat upper part by means of a first floating bearing and to the shaft by means of a second floating bearing, and the second scissor arm is connected to the vehicle seat upper part by means of a third floating bearing and to the shaft by means of a fourth floating bearing. Such a configuration also allows a pitching suspension movement of the vehicle seat by means of the suspension unit.

According to the design of the first scissor arm and the second scissor arm by means of four floating bearings for connection to the vehicle seat upper part and the vehicle seat lower part, it is achieved that the pitching movement of the vehicle seat can be easily followed when the vehicle seat is pitched and when the vehicle seat upper part follows the vehicle seat lower part accordingly. Because four floating bearings are provided, the suspension unit is mechanically indeterminate, i.e. degrees of freedom still exist which cannot be adequately determined. In order to further minimise these degrees of freedom, a first connecting element and a second connecting element are provided, which minimise the degrees of freedom of the four floating bearings through the corresponding arrangement with the first scissor arm and the second scissor arm and the vehicle seat upper part and the vehicle seat lower part. Particularly preferably, a first connecting element is provided which connects the first scissor arm to a fixed bearing which is arranged on the first axis of rotation and preferably on the shaft, and wherein a second connecting element is provided which has a first connecting element part and a second connecting element part, wherein the first connecting element part is rotatably connected to the second scissor arm and the second connecting element part, and wherein the second connecting element part is rotatably connected to the first connecting element part, the first scissor arm and the vehicle seat upper part.

Alternatively, the scissor arrangement can be such that the first scissor arm is connected to the vehicle seat lower part by means of a fixed bearing and to the vehicle seat upper part by means of a first floating bearing and the second scissor arm is connected to the vehicle seat upper part by means of a further fixed bearing and to the vehicle seat lower part by means of a fourth floating bearing.

According to a further preferred embodiment, it is provided that the second floating bearing and the fourth floating bearing are each designed as a displacement element so that the first scissor arm and the second scissor arm are in each case displaceable relative to the shaft. A displacement with respect to the shaft means that a displacement of the first scissor arm and of the second scissor arm is provided in the vehicle seat longitudinal direction. The displacement element can be designed as a sliding element or as a rolling element, so that a smooth displacement of the first scissor arm and the second scissor arm relative to the shaft can be ensured.

According to a further preferred embodiment, it is provided that, when viewed in the longitudinal direction of the vehicle seat, the second floating bearing is arranged in front of the third floating bearing and the first floating bearing is arranged in front of the fourth floating bearing.

By a rolling movement of the vehicle seat and a corresponding tracking of the spring support element, which is in connection with the first or the second spring element, which can in particular be designed to be resiliently deformable, the spring support element causes deformation of the spring elements, whereby a spring force or a restoring force of the spring elements is generated.

According to a further preferred embodiment, a locking unit is provided so that a movement of the suspension unit can be locked about the first axis of rotation, so that a rotational movement about the first axis of rotation can preferably be blocked. This is advantageous if the vehicle is moving on a level surface, such as a street, where usually little or no rolling movements occur.

Alternatively, the object is achieved by a vehicle seat having a suspension unit for cushioning the rolling and vertical movements of the vehicle seat, wherein the vehicle seat has a vehicle seat upper part and a vehicle seat lower part, wherein the vehicle seat upper part and the vehicle seat lower part are connected by means of the suspension unit so that the vehicle seat upper part and the vehicle seat lower part are movable relative to one another, wherein the suspension unit comprises a scissor arrangement having a first scissor arm and a second scissor arm, the suspension unit being connected rotatably about a first axis of rotation to the vehicle seat lower part and comprising a spring element support and a first spring element, a displacement element being provided which is mounted displaceably with respect to the vehicle seat lower part, and the first spring element being connected on the one hand to the displacement element and on the other hand to the vehicle seat upper part.

The further configurations of the preceding embodiments apply in a correspondingly analogous manner to this alternative embodiment.

Further advantageous embodiments result from the dependent claims.

BRIEF DESCRIPTION OF THE DRAWINGS

Additional aims, advantages and expedient uses of the present invention can be found in the following description in conjunction with the drawings, in which.

DETAILED DESCRIPTION

Figure 1A:
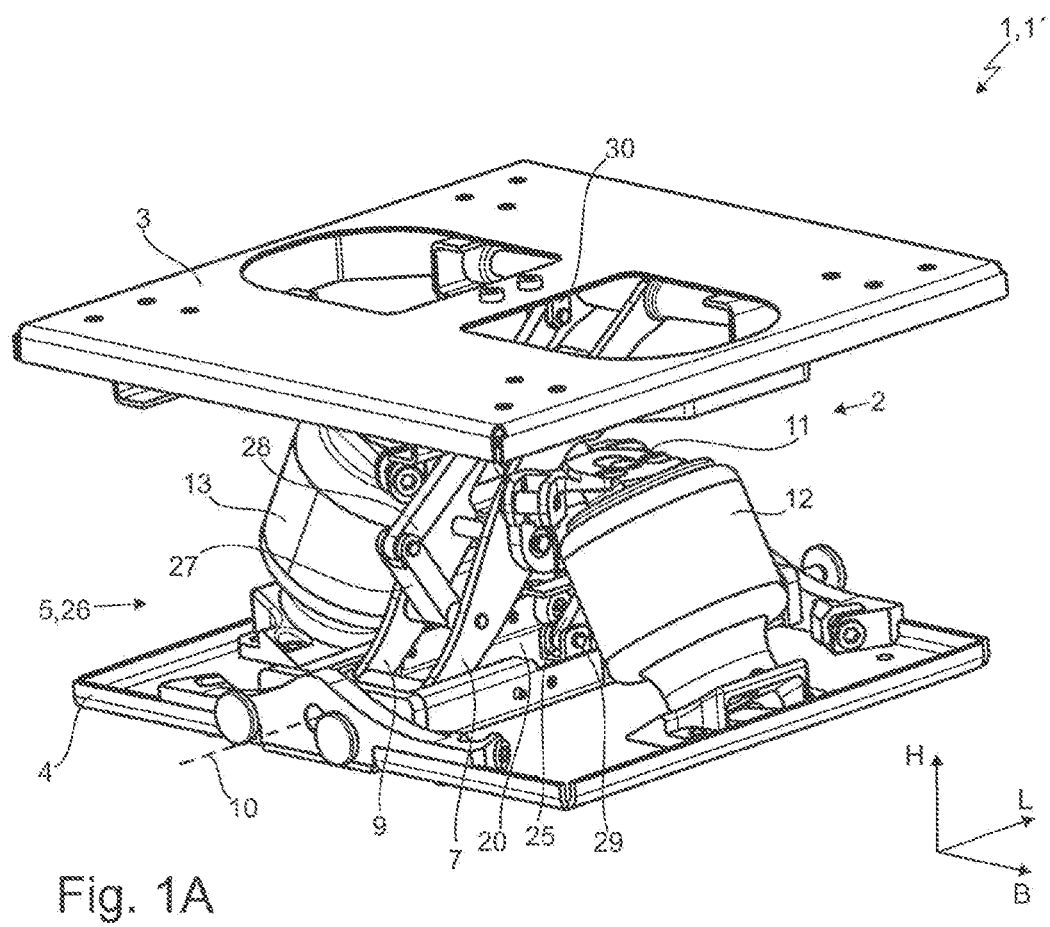
FIG. 1A is a perspective view of a vehicle seat according to a preferred embodiment.

In the drawings, the same components are denoted by the same reference signs, wherein it is possible for the reference signs to be omitted in some drawings for greater clarity.

FIG. 1A shows a vehicle seat 1 or a vehicle seat substructure 1', wherein the vehicle seat 1 has a vehicle seat upper part 3 and a vehicle seat lower part 4, which are connected to one another by means of a suspension unit 2 in such a way that the vehicle seat upper part and the vehicle seat lower part can be moved and cushioned relative to one another. It can also be seen that the suspension unit 2 is rotatably connected about a first axis of rotation 10 to the vehicle seat lower part 4.

A locking unit 51 is also preferably provided, comprising a first screw element 49 and a second screw element 50. The screw elements 49, 50 can connect the vehicle seat lower part 4 and the suspension unit 2 to one another by a rotary movement, so that the suspension unit 2 can no longer move about the first axis of rotation 10. The screw elements 49, 50 can particularly preferably be connected to a support part 40. The screw elements 49, 50 are preferably designed as knurled screws. The screw elements 49, 50 are more preferably arranged at a distance from the first axis of rotation 10, in particular symmetrically with respect to the first axis of rotation 10.

The suspension unit comprises a scissor arrangement 5 having a first scissor arm 6 and a second scissor arm 7, wherein the suspension unit further comprises a spring element support 11 and a first spring element 12 and a second spring element 13. As can be seen, the spring element support is rotatably connected about a second axis of rotation to the first scissor arm and rotatably connected about a third axis of rotation 15 to the second scissor arm 7, wherein the first spring element 12 is connected to the vehicle seat lower part 4 on the one hand and to the spring element support 11 on the other hand, wherein the first spring element 12 is further arranged at a first angle 16 to a vehicle seat width direction B and at a second angle 17 to a vehicle seat height direction H.

The more detailed arrangement of the spring elements 12, 13 and the more detailed configuration of the scissor arrangement 5 are described further in the following drawings.

The first air spring 12 and the second air spring 13 are designed as a resiliently deformable air spring in FIG. 1A, wherein it is also conceivable that the first spring element 12 and the second spring element 13 can be designed as a mechanical spring.

It is also conceivable that the first spring element 12 is designed as an air spring and the second spring element 13 is designed as a mechanical spring, or vice versa.

Furthermore, the scissor arrangement 5 has a first connecting element 25 and a second connecting element 26, wherein the second connecting element 25 has a first connecting element part 27 and a second connecting element part 28, wherein the first connecting element 25 is rotatably connected to the first scissor arm 6 and on the other hand is connected to a first fixed bearing 29, wherein the first fixed bearing 29 is connected to a shaft 20.

Furthermore, the first connecting element part 27 is rotatably connected to the second scissor arm 7 and rotatably connected to the second connecting element part 28, wherein the second connecting element part 28 is further rotatably connected to the first scissor arm 7 and connected to the vehicle seat upper part 3 by means of a fixed bearing 30.

Figure 1B:
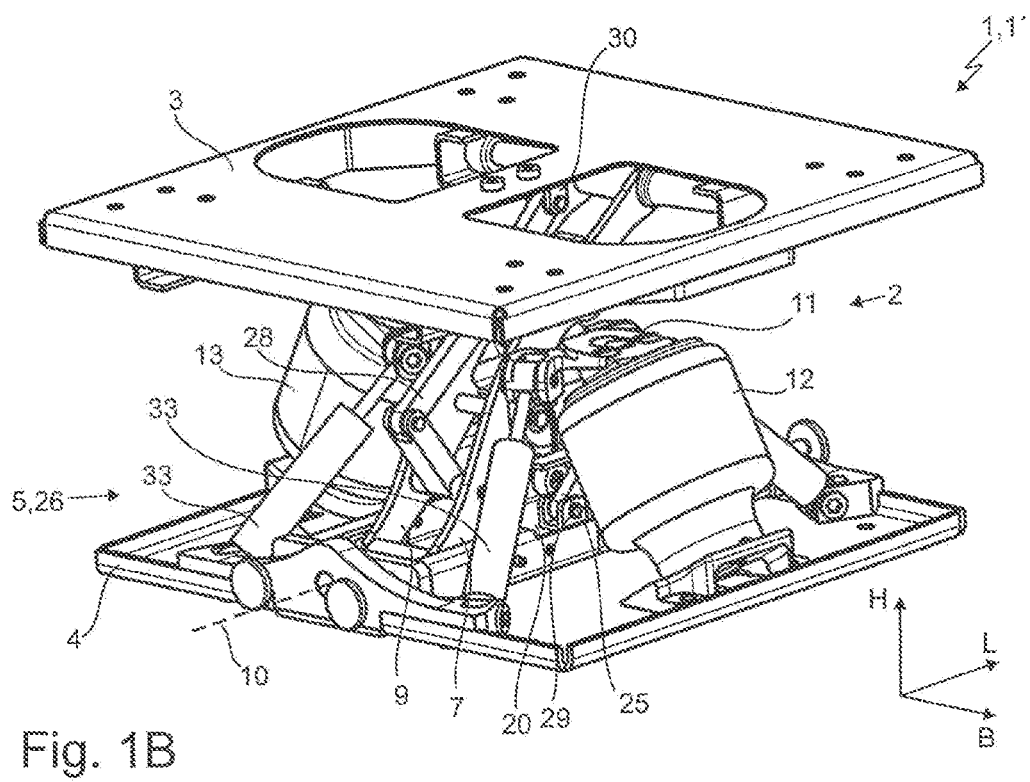
FIG. 1B shows the vehicle seat according to FIG. 1A in a further embodiment.

FIG. 1B shows the same vehicle seat 1 as shown in FIG. 1A, with additional damper elements 33 being provided, at least one damper element 33, preferably at least two damper elements 33 and particularly preferably four damper elements 33 being provided, which are each arranged at an angle to the vehicle seat longitudinal direction L, the vehicle seat width direction B and the vehicle seat height direction H. Furthermore, the damper elements 33 are connected to the spring element support 11 on the one hand and to the vehicle seat lower part 4 on the other hand.

Figure 2A:
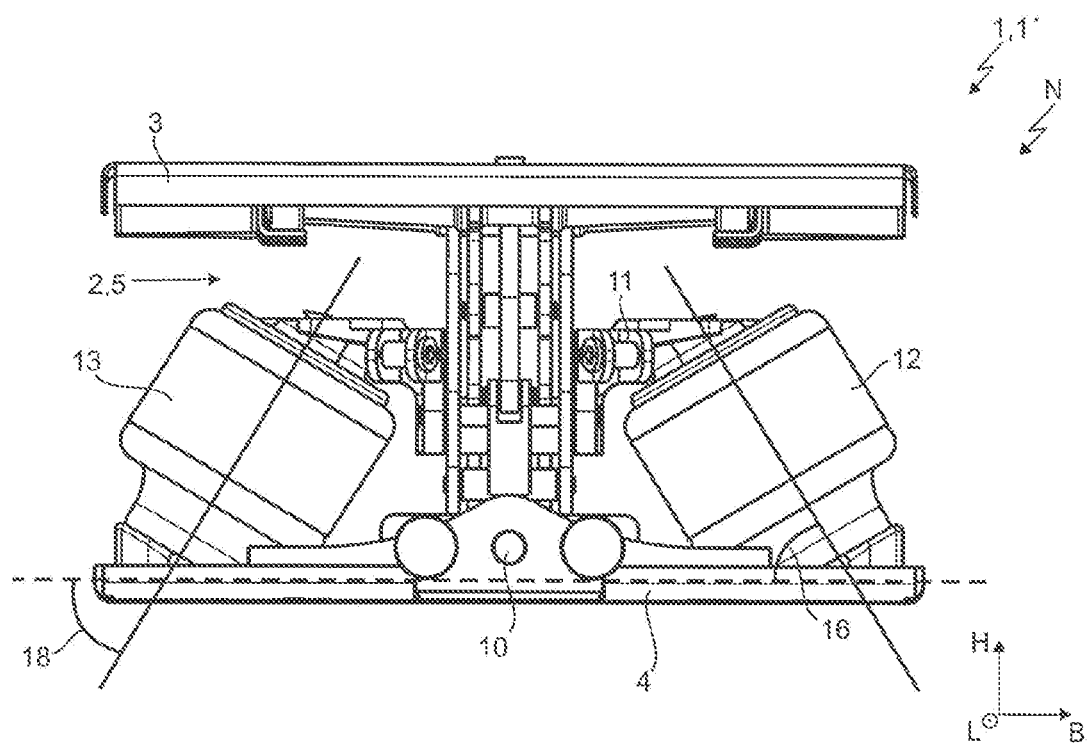
FIG. 2A is a front view of the vehicle seat according to FIG. 1A in a neutral position.
Figure 2B:
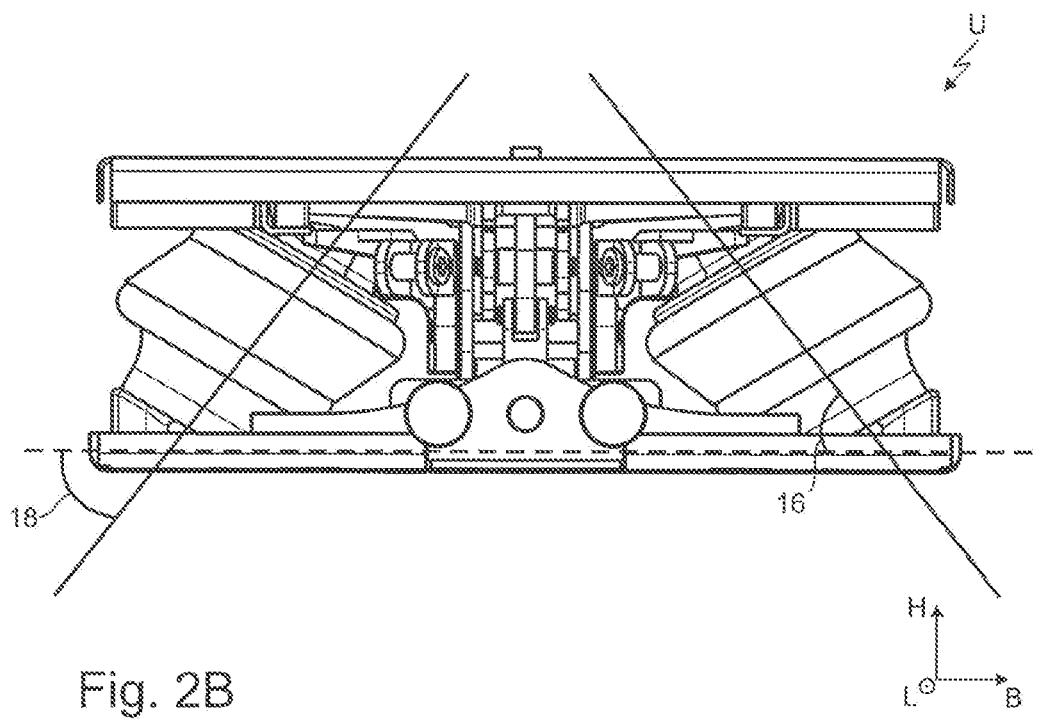
FIG. 2B shows the vehicle seat according to FIG. 2A in a downwardly deflected position.
Figure 2C:
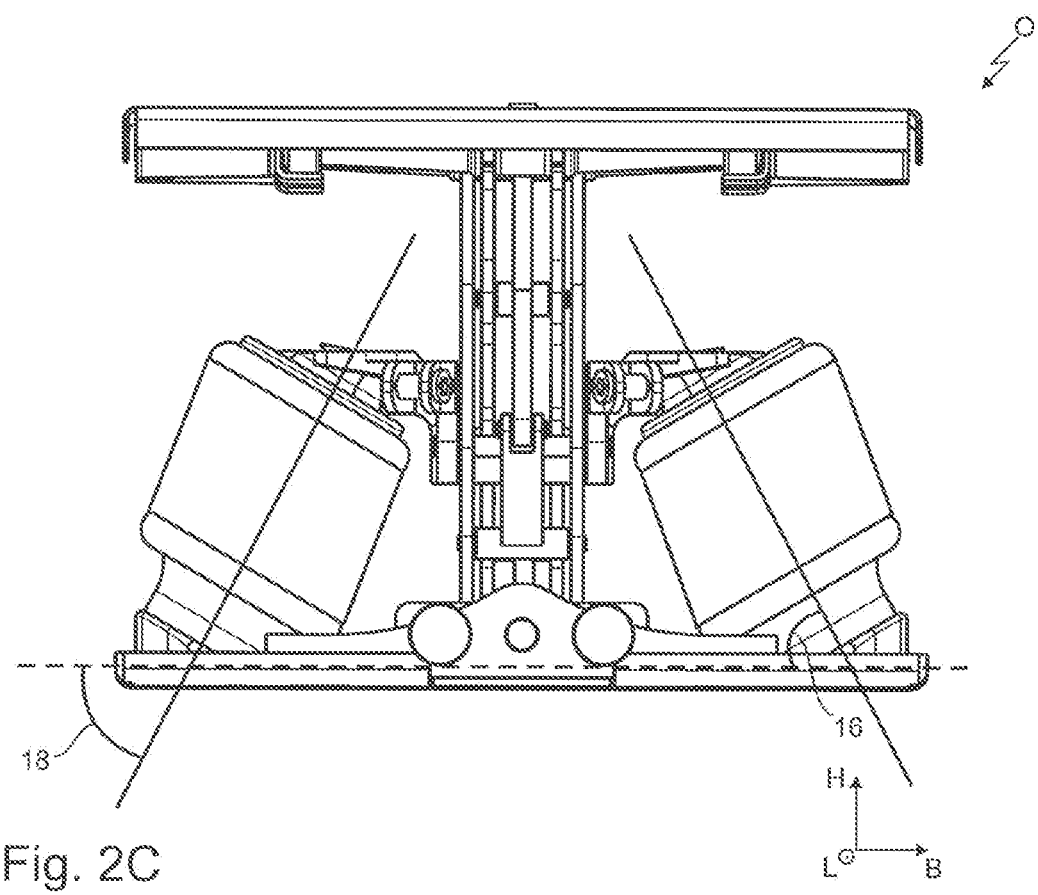
FIG. 2C shows the vehicle seat according to FIG. 2A in a upwardly deflected position.

In FIGS. 2A, 2B and 2C, the vehicle seat according to FIG. 1A is shown in a front view, wherein in FIG. 2A the vehicle seat 1 is shown in a neutral position N, in FIG. 2B it is shown in a downwardly deflected position U, and in FIG. 2C it is shown in an upwardly deflected position O, wherein "upwardly" and "downwardly" are of course to be understood in the vehicle seat height direction H in each case.

With regard to FIG. 2A, which shows the vehicle seat 1 in the neutral position N, it can be seen that the first spring element 12 is arranged at a first angle 16 and the second spring element 13 at a third angle 18 to the vehicle seat width direction B. According to the invention, it is provided that the first spring element 12 and the second spring element 13 are connected to the spring element support 11 on the one hand and to the vehicle seat lower part 4 on the other hand. In the case of a suspension movement in the vehicle seat height direction H, i.e. in the vertical direction of the vehicle seat 1, it is provided that the position of the first spring element 12 or the second spring element 13 is changed at this point through the connection to the vehicle seat lower part 4, but when moving in the vehicle seat height direction in the direction H, the spring element support 11 naturally also moves upwards or downwards in the vehicle seat height direction H. This means that the connection point between the spring elements 12, 13 to the spring element support 11 also moves upwards or downwards in the vehicle seat height direction H. This means that the first angle 16 and the third angle 18 are not constant during a suspension movement in the vehicle seat height direction H.

Figure 3A:
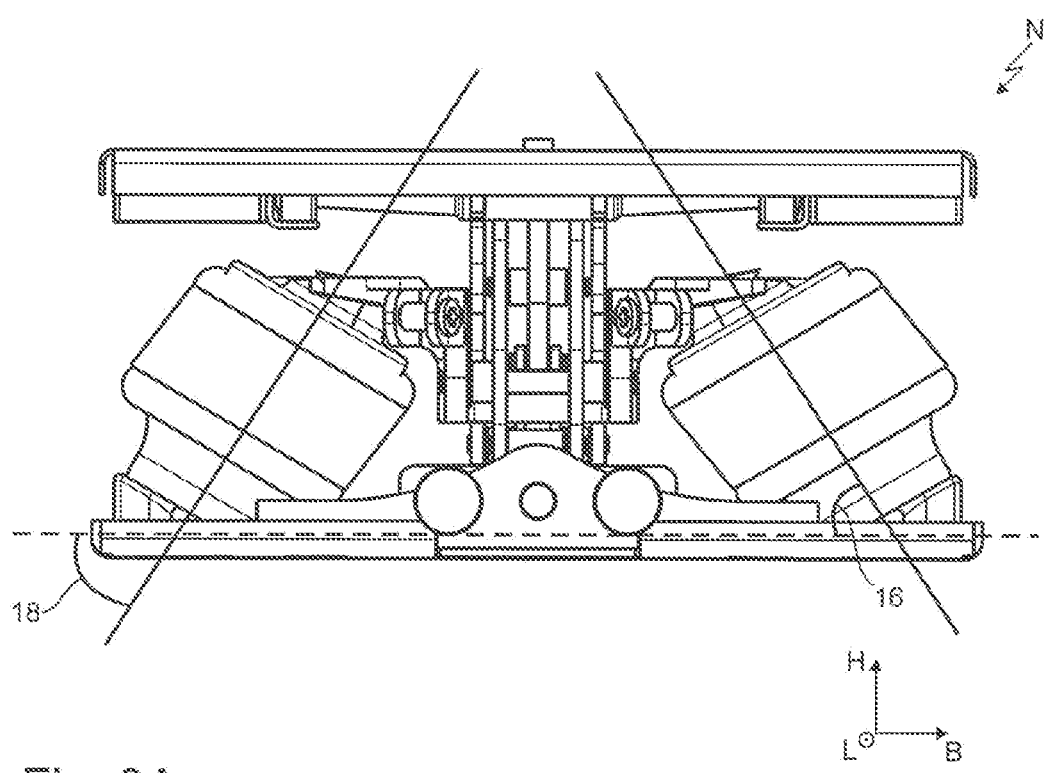
FIG. 3A is a front view of the vehicle seat according to FIG. 1A in the neutral position.
Figure 3B:
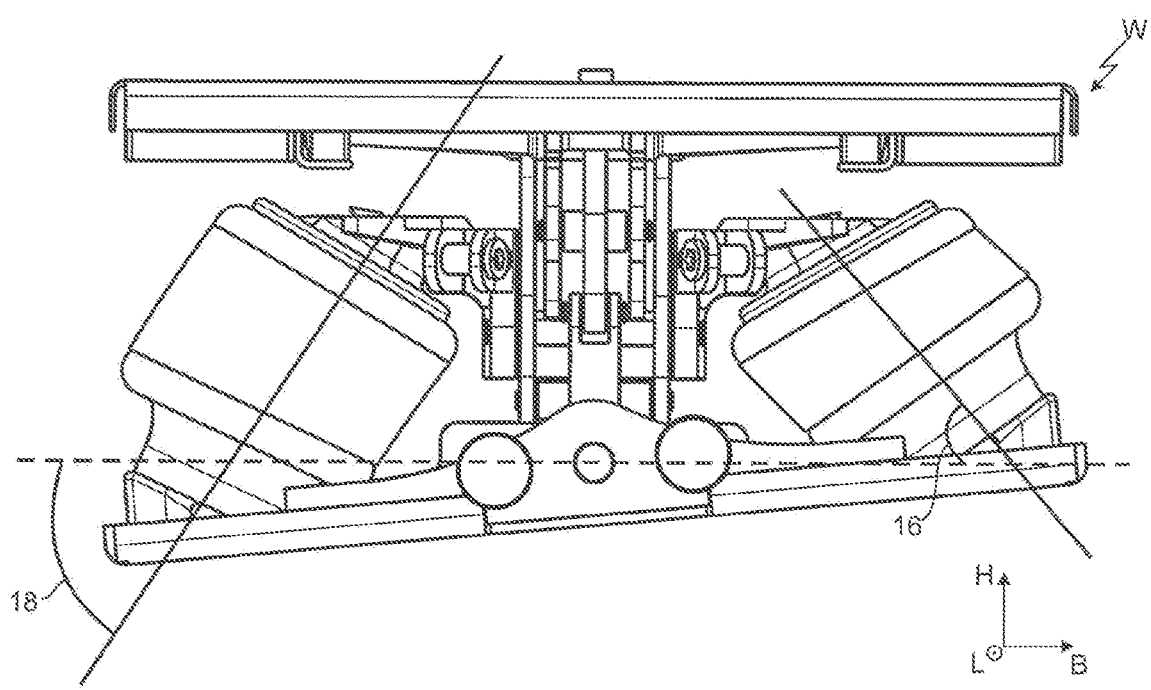
FIG. 3B shows the vehicle seat according to FIG. 3A in a rolling position.

The same also applies to FIGS. 3A and 3B, with the vehicle seat being shown in the neutral position in FIG. 3A and the vehicle seat being shown after a rolling movement W in FIG. 3B. In this case, it should be noted that the connection between the spring elements 12, 13 does not move with the spring element support, but rather the position of the lower connection between the spring elements 12, 13 and the vehicle seat lower part 4 changes. However, the reverse can also occur, depending on the installation situation and the vibration that occurs.

Figure 4A:
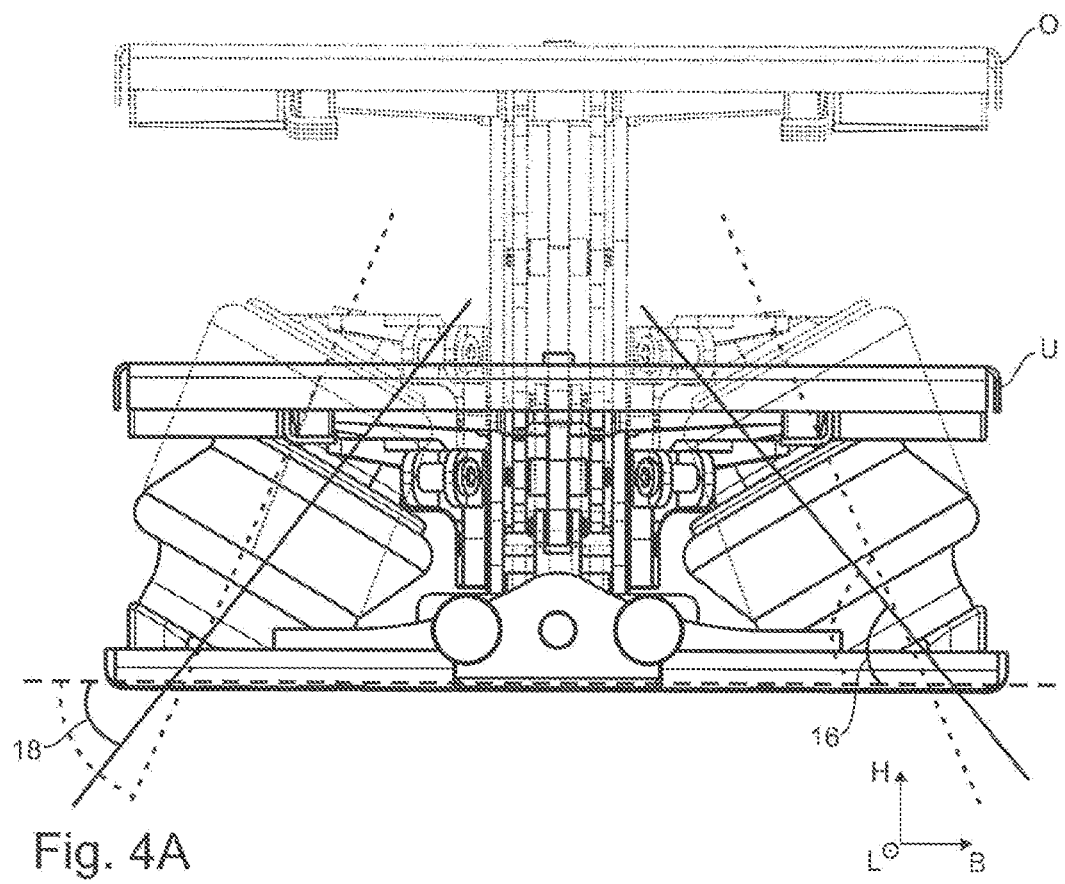
FIG. 4A shows a comparison between FIGS. 2B and 2C.

The change in angles 16, 17, 18, 19 can be seen from a comparison of FIG. 2A-2C and FIGS. 3A and 3B. An overlay of FIG. 2A-2C is shown in FIG. 4A and an overlay of FIGS. 3A and 3B can be seen in FIG. 4B. The change in angle is again shown schematically.

Referring to FIG. 4A, in which, on the one hand, the vehicle seat 1 is shown by the solid lines in a downward position U, and is shown by the dashed lines in an upward position O, wherein the change in the associated first angle 16 or the third angle 18 can be seen.

Figure 4B:
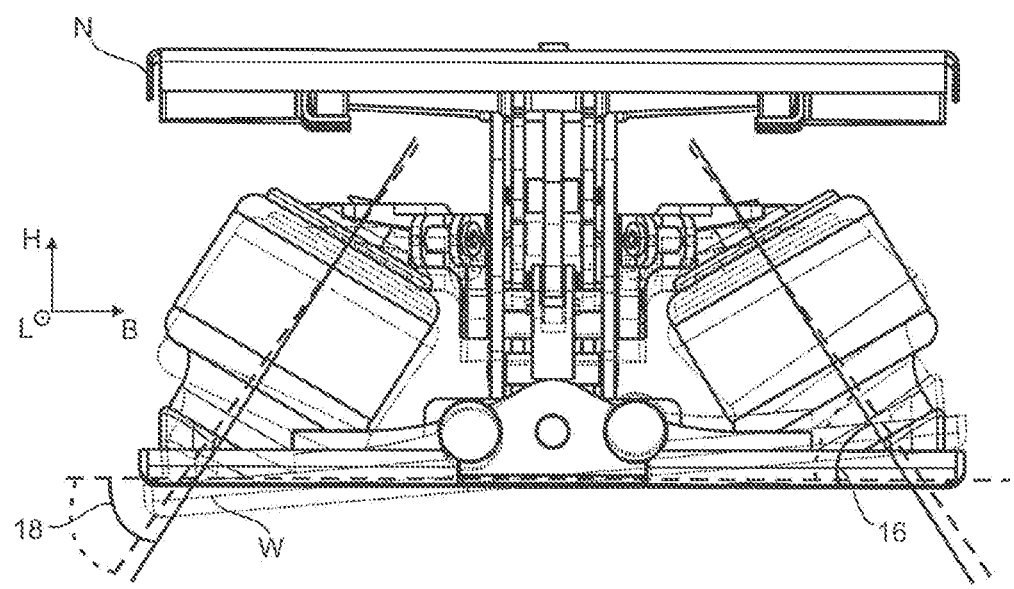
FIG. 4B shows a comparison between FIGS. 3A and 3B.

FIG. 4B shows the comparison of FIGS. 3A and 3B, a neutral position N of the vehicle seat 1 being shown by the solid lines and the rolling position W of the vehicle seat 1 being shown by the dashed lines.

Figure 5:
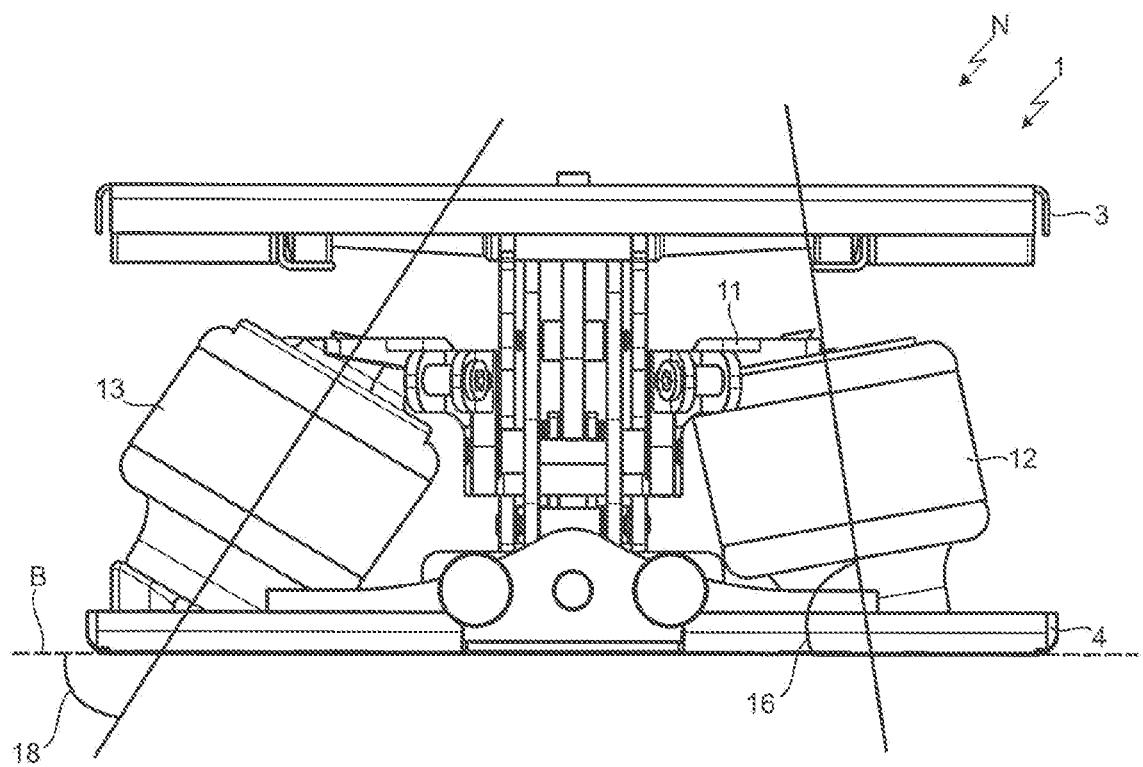
FIG. 5 shows a vehicle seat according to one embodiment with different angles of attack of the spring elements.

The vehicle seat 1 according to FIG. 2A can also be seen in FIG. 5, wherein the angles of attack, i.e. the first angle 16 and the third angle 18, are different from one another. This means that the first angle 16 has a different angle from the third angle 18.

In general, the description with regard to the first angle 16 and the third angle 18 also applies to the second angle 17 and the fourth angle 19.

By adjusting the angles 16, 17, 18, 19, the spring stiffnesses in the rolling and vertical spring directions are adjusted. Since the position of the spring element support 11 is arranged so as to not be changed by the associated axes of rotation, the spring connection points are changed in the distance from the first axis of rotation 10 with respect to the vehicle seat lower part 4, which causes an angle change of the angles 16, 17, 18, 19.

However, it can also be provided that in a neutral position N of the vehicle seat 1, the first angle 16 corresponds to the third angle 18 and the second angle 17 corresponds to the fourth angle 19.

The configuration with different angles for the respective spring element 12, 13 makes it possible to adjust the spring stiffness of the spring elements 12, 13.

Figure 6A:
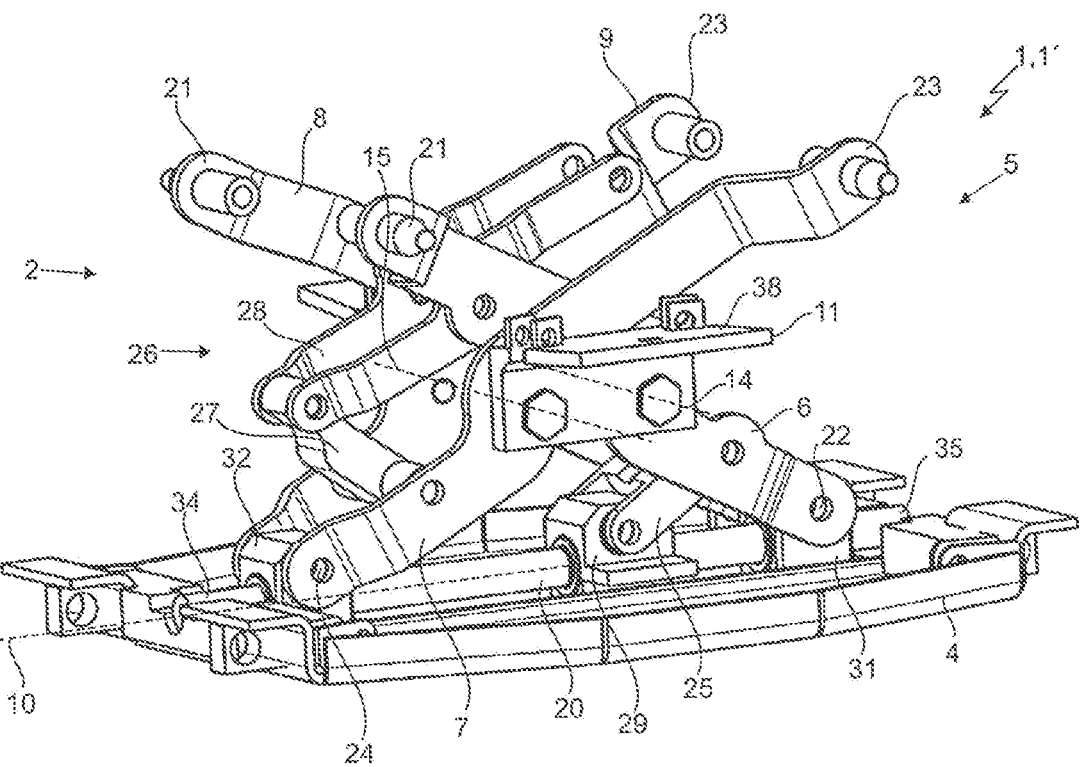
FIG. 6A shows a scissor arrangement according to a first embodiment.
Figure 6B:
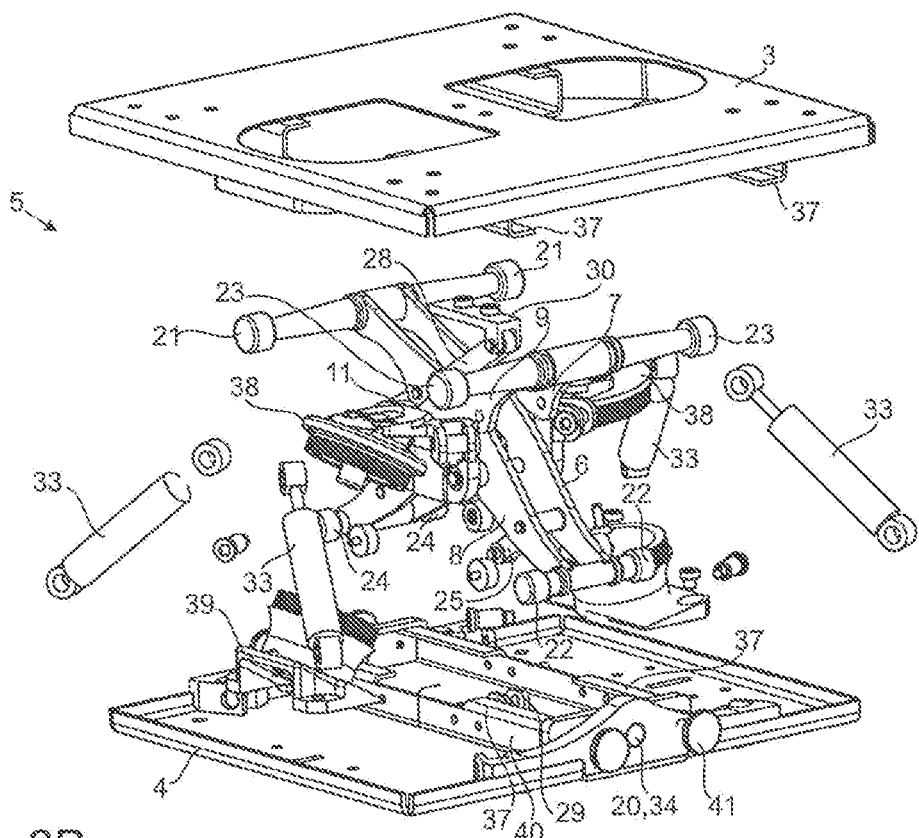
FIG. 6B shows a scissor arrangement according to a second embodiment.

A first embodiment of the scissor arrangement 5 can be seen in FIG. 6A and a second embodiment of the scissor arrangement 5 can be seen in FIG. 6B.

The embodiment of the scissor arrangement 5 according to FIG. 6A will be described first.

The scissor arrangement 5 comprises a first scissor arm 6, a second scissor arm 7, a third scissor arm 8 and a fourth scissor arm 9.

The designs of the third scissor arm 8 and the fourth scissor arm 9 apply correspondingly to the associated first scissor arm 5 and the associated second scissor arm 7. This is particularly true since the third scissor arm 8 runs identically to the first scissor arm 6 and the fourth scissor arm 9 runs identically to the second scissor arm 7.

As can also be seen, the spring element support 11 is provided, which is rotatably connected about a second axis of rotation 14 to the first scissor arm 6 and rotatably connected about a third axis of rotation 15 to the second scissor arm 7.

Furthermore, the first scissor arm 6 is connected to the vehicle seat upper part 3 by means of a first floating bearing 21 and to a shaft 20 by means of a second floating bearing 22, and the second scissor arm 7 is connected to the vehicle seat upper part 3 by means of a third floating bearing 23 and to the shaft 20 by means of a fourth floating bearing 24, wherein a first connecting element 25 connects the first scissor arm 6 to a first fixed bearing 29 which is arranged on the shaft 20, and wherein a second connecting element 26 is provided which has a first connecting element part 27 and a second connecting element part 28, wherein the first connecting element part 27 is rotatably connected to the second scissor arm 7 and the second connecting element part 28, and wherein the second connecting element part 28 is rotatably connected to the first connecting element part 27, the first scissor arm 6 and the vehicle seat upper part 3. The second connecting element part 28 is rotatably connected in particular to a second fixed bearing 30. The second fixed bearing is arranged on the vehicle seat upper part 3.

The first floating bearing 21 and the second floating bearing 23 are each designed as running rollers 36, which are rotatably connected to the respective scissor arm 6, 7, 8, 9 and are mounted in a rolling manner in a running rail 37, wherein the running rail 37 is arranged on the vehicle seat upper part 3.

The second floating bearing 22 and the fourth floating bearing 24 are designed in such a way that a first displacement element 31 and a second displacement element 32 are provided, wherein the first scissor arm 6 is rotatably connected to the first displacement element and the second scissor arm 7 is rotatably arranged on the second displacement element 32.

The displacement elements 31, 32 can be displaced in such a way that they can be displaced with respect to the shaft 20 in the direction of the first axis of rotation 10. Further preferably, the displacement elements 31, 32 are mounted rotatably about the first axis of rotation 10, in the case of a shaft 20 which has a substantially cylindrical design.

The first displacement element 31 and the second displacement element 32 are displaced in particular during a vertical movement of the vehicle seat 1.

Because the scissor arms 6, 7, 8, 9 are each connected to the vehicle seat lower part 4 or to the vehicle seat upper part 3 by means of a floating bearing, it is necessary to limit the degrees of freedom with regard to the movement of the scissor arrangement 5. This is done by means of the first connecting element 25 and the second connecting element 26.

Furthermore, the spring element support 11 has an adapter plate 38, by means of which the respective spring element 12, 13 (not shown here) can be connected to the spring element support 11.

The second embodiment, which is shown in FIG. 6B, is identical in terms of its functional principle to the embodiment of FIG. 6A, although the configuration differs.

The embodiment of FIG. 6B also includes a first scissor arm 6, a second scissor arm 7, a third scissor arm 8, and a fourth scissor arm 9, wherein the first scissor arm 6 and the third scissor arm 8 as well as the second scissor arm 7 and the fourth scissor arm 9 each run identically. Likewise, the respective scissor arms 6, 7, 8, 9 are guided in the guide rail 37 of the vehicle seat upper part 3 by means of a floating bearing 21, 23 which is designed as a running roller 36.

This embodiment also has the first connecting element 25 and the second connecting element 26 in the same arrangement and function as described in FIG. 6A.

The arrangement of the floating bearings 22, 24 with respect to the vehicle seat lower part 4 is different here. In particular, a support part 40 is shown which is rotatably connected to the vehicle seat lower part 4 about the first axis of rotation 10. A shaft 20 is provided at the front and the rear end of the support part in the vehicle seat longitudinal direction L, the support part 40 also having running rails 37 in which the floating bearings 22, 24 can roll by means of running rollers 36 with respect to the support part 40.

The first fixed bearing 29, by means of which the first scissor arm 6 is connected by means of the first connecting element 25, is also arranged on the support part 40.

A lower adapter plate 39 is also shown schematically in FIG. 6B, by means of which the spring element 12, 13 can be connected to the vehicle seat lower part 4. As can be seen, the lower adapter plate 39 has an inclined portion, by means of which the angle of the corresponding spring element 12, 13 and the resulting distance from the first axis of rotation 10 can be adjusted.

The same also applies to the upper adapter plate 38, which has an angle with respect to the vehicle seat width direction B, wherein the inclination of the upper adapter plate 38 and of the lower adapter plate 39 are parallel to one another. However, an angular offset between the adapter plates 38, 39 can also be provided or permitted.

Figure 7A:
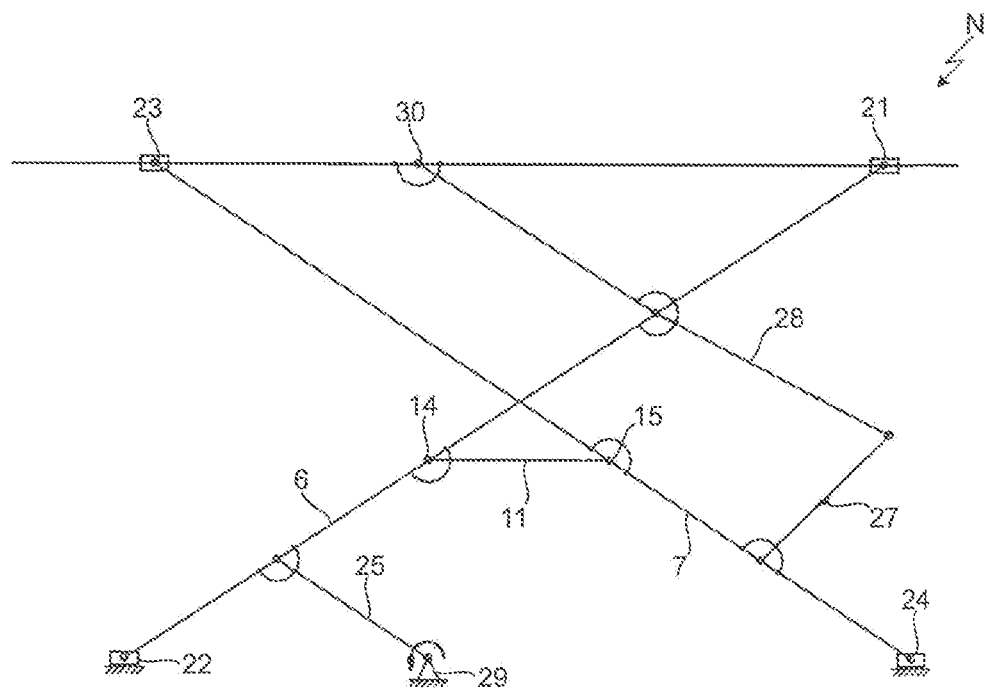
FIG. 7A is a schematic representation of the vehicle seat according to FIG. 1A in the neutral position.
Figure 7B:
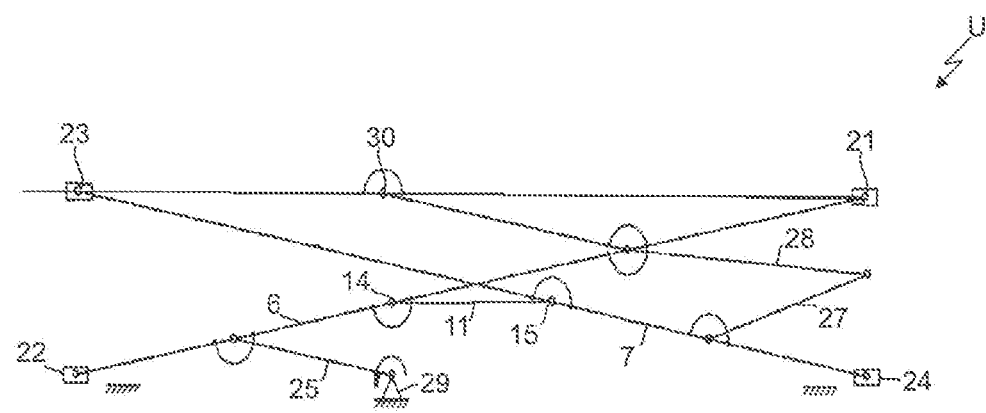
FIG. 7B is a schematic representation of the vehicle seat according to FIG. 1A in the downwardly displaced position.

In FIGS. 7A and 7B, the kinematics of the moving parts of the vehicle seat 1 is shown again schematically.

In FIG. 7A, the vehicle seat is shown in the neutral position N and in FIG. 7B in the downward position U.

The movement of the moving parts, which are denoted by the corresponding reference signs, can be seen by comparing FIGS. 7A and 7B.

Figure 8A:
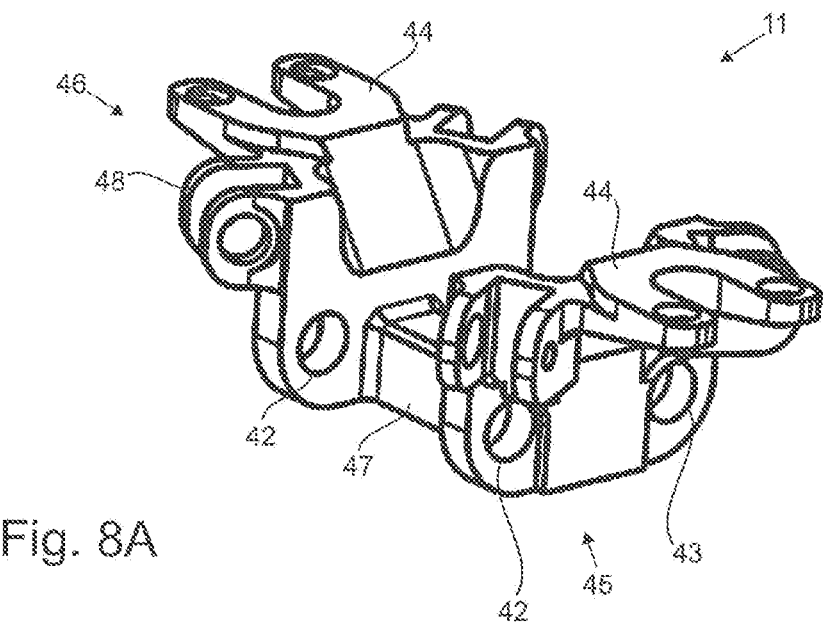
FIG. 8A is a first perspective view of a spring support element.
Figure 8B:
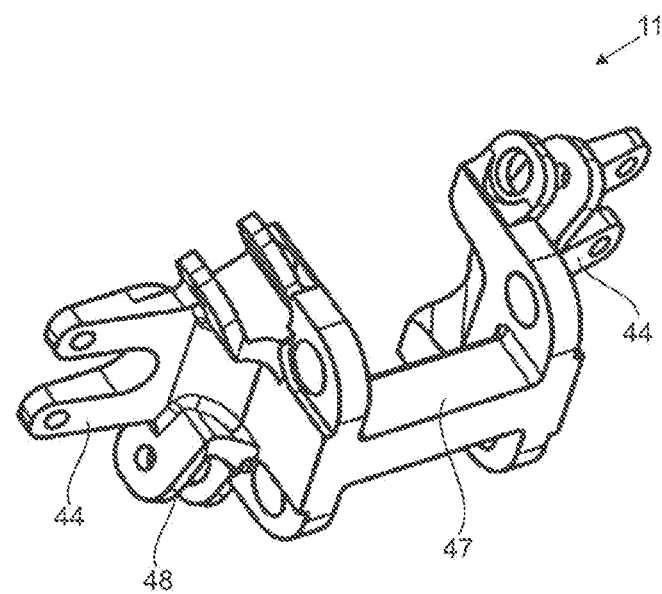
FIG. 8B is a second perspective view of a spring support element.

Furthermore, FIGS. 8A and 8B show the spring element support 11 in a first perspective and in a second perspective representation.

The spring element support 11 has a first spring element support holder 45 and a second spring element support holder 46, which are connected to one another by means of a connecting part 47. The respective spring element support holder 45, 46 has a first connection point 42 and a second connection point 43, by means of which the spring element support can be connected, in particular rotatably, to the first scissor arm 6 and the second scissor arm 7, or to the third scissor arm 8 and the fourth scissor arm 9.

Furthermore, both the first spring element holder 45 and the second spring element holder 46 have an adapter plate holder 44, by means of which the upper adapter plate 38 can be connected to the spring element support (11).

All features disclosed in the application documents are claimed as being substantial to the invention, provided that they are, individually or in combination, novel over the prior art.

LIST OF REFERENCE SIGNS

1 Vehicle seat
2 Suspension unit
3 Vehicle seat upper part
4 Vehicle seat lower part
5 Scissor arrangement
6 First scissor arm
7 Second scissor arm
8 Third scissor arm
9 Fourth scissor arm
10 First axis of rotation
11 Spring element support
12 First spring element
13 Second spring element
14 Second axis of rotation
15 Third axis of rotation
16 First angle
17 Second angle
18 Third angle
19 Fourth angle
20 Shaft
21 First floating bearing
22 Second floating bearing
23 Third floating bearing
24 Fourth floating bearing
25 First connecting element
26 Second connecting element
27 First connecting element part
28 Second connecting element part
29 First fixed bearing
30 Second fixed bearing
31 First displacement element
32 Second displacement element
33 Damper element
34 First end of the shaft
35 Second end of the shaft
36 Running roller
37 Running rail
38 Adapter plate
39 Lower adapter plate
40 Support part
41 Locking element
42 First connection point
43 Second connection point
44 Adapter plate holder
45 First spring element support holder
46 Second spring element support holder
47 Connecting part
48 Damper element holder
49 First screw element
50 Second screw element
51 Locking unit
N Neutral position
O Upward deflected position
U Downward deflected position
W Rolling position
L Vehicle seat longitudinal direction
B Vehicle seat width direction
H Vehicle seat height direction

What is claimed is:

1. A vehicle seat comprising a suspension unit for cushioning rolling and vertical suspension movements of the vehicle seat, wherein the vehicle seat has a vehicle seat upper part and a vehicle seat lower part, wherein the vehicle seat upper part and the vehicle seat lower part are connected by means of the suspension unit so that the vehicle seat upper part and the vehicle seat lower part are movable relative to one another, wherein the suspension unit has a scissor arrangement having a first scissor arm and a second scissor arm, wherein the suspension unit is connected rotatably about a first axis of rotation to the vehicle seat lower part and comprises a spring element support and a first spring element, the first spring element being connected to the vehicle seat lower part and to the spring element support, wherein the first spring element is arranged at a first angle to a vehicle seat width direction and at a second angle to a vehicle seat height direction, and wherein the first axis of rotation is parallel to a vehicle seat longitudinal direction.

2. The vehicle seat according to claim 1, wherein the suspension unit comprises a second spring element, the second spring element being connected to the vehicle seat lower part and to the spring element support, and wherein the second spring element being is arranged at a third angle to the vehicle seat width direction and at a fourth angle to the vehicle seat height direction.

3. The vehicle seat according to claim 1, wherein the first angle and the second angle each have a value in a range of 0 to 90°.

4. The vehicle seat according to claim 2, wherein the third angle and the fourth angle each have a value in a range of 0 to 90°.

5. The vehicle seat according to claim 1, wherein the first axis of rotation is defined by a shaft.

6. The vehicle seat according to claim 1, wherein the first scissor arm is displaceably connected by means of a first floating bearing to the vehicle seat upper part and by means of a second floating bearing with respect to the first axis of rotation, wherein the second scissor arm is displaceably connected by means of a third floating bearing to the vehicle seat upper part and by means of a fourth floating bearing with respect to the first axis of rotation, wherein a first connecting element connects the first scissor arm to a first fixed bearing which is arranged rigidly with respect to the first axis of rotation, wherein a second connecting element is provided which has a first connecting element part and a second connecting element part, wherein the first connecting element part is rotatably connected to the second scissor arm and the second connecting element part, and wherein the second connecting element part is rotatably connected to the first connecting element part, the first scissor arm and the vehicle seat upper part.

7. The vehicle seat according to claim 1, wherein the first scissor arm is connected to a support part by means of a fixed bearing and to the vehicle seat upper part by means of a first floating bearing, and the second scissor arm is connected to the vehicle seat upper part by means of a second fixed bearing and to the support part by means of a fourth floating bearing.

8. The vehicle seat according to claim 6, wherein the second floating bearing and the fourth floating bearing are each designed as a displacement element so that the first scissor arm and the second scissor arm are in each case displaceable relative to a shaft.

9. The vehicle seat according to claim 6, wherein when viewed in the vehicle seat longitudinal direction, the second floating bearing is arranged in front of the third floating bearing and the first floating bearing is arranged in front of the fourth floating bearing.

10. The vehicle seat according to claim 1, wherein the spring element support is rotatably connected about a second axis of rotation to the first scissor arm and rotatably connected about a third axis of rotation to the second scissor arm.

11. A vehicle seat having a suspension unit for cushioning rolling and vertical suspension movements of a vehicle, wherein the vehicle seat has a vehicle seat upper part and a vehicle seat lower part, wherein the vehicle seat upper part and the vehicle seat lower part are connected by means of the suspension unit so that the vehicle seat upper part and the vehicle seat lower part are movable relative to one another, wherein the suspension unit has a scissor arrangement having a first scissor arm and a second scissor arm, wherein the suspension unit is connected rotatably about a first axis of rotation to the vehicle seat lower part and comprises a first spring element, the first spring element being connected to the vehicle seat lower part and to the vehicle seat upper part, wherein the first spring element is arranged at a first angle to a vehicle seat width direction and at a second angle to a vehicle seat height direction, and wherein the first axis of rotation is parallel to a vehicle seat longitudinal direction.

12. A vehicle seat comprising a suspension unit for cushioning rolling and vertical suspension movements of the vehicle seat, wherein the vehicle seat has a vehicle seat upper part and a vehicle seat lower part, wherein the vehicle seat upper part and the vehicle seat lower part are connected by means of the suspension unit so that the vehicle seat upper part and the vehicle seat lower part are movable relative to one another, wherein the suspension unit has a scissor arrangement having a first scissor arm and a second scissor arm, wherein the suspension unit is connected rotatably about a first axis of rotation to the vehicle seat lower part and comprises a spring element support and a first spring element, wherein the first spring element is connected to the vehicle seat lower part and to the spring element support, wherein the first spring element is arranged at a first angle to a vehicle seat width direction and at a second angle to a vehicle seat height direction, and wherein the spring element support is rotatably connected about a second axis of rotation to the first scissor arm and rotatably connected about a third axis of rotation to the second scissor arm.

13. The vehicle seat according to claim 10, wherein the second axis of rotation and the third axis of rotation are arranged extending in the vehicle seat width direction and the second and the third axis of rotation are arranged parallel to one another.

14. The vehicle seat according to claim 12, wherein the second axis of rotation and the third axis of rotation are arranged extending in the vehicle seat width direction and the second and the third axis of rotation are arranged parallel to one another.

* * * * *